United States Patent [19]

Swain et al.

[11] Patent Number: 4,961,627

[45] Date of Patent: Oct. 9, 1990

[54] TWO-AXIS BEAM STEERING APPARATUS

[75] Inventors: David M. Swain, Thousand Oaks; Gregory A. Needham, Simi Valley; Louis R. Fontana, Canoga Park, all of Calif.

[73] Assignee: Rockwell International Corporation, El Segundo, Calif.

[21] Appl. No.: 237,200

[22] Filed: Aug. 29, 1988

[51] Int. Cl.$^5$ ............................ G02B 7/22; G02B 7/02
[52] U.S. Cl. ................................... 350/319; 350/487; 350/252; 350/589; 310/317; 310/328
[58] Field of Search ............... 350/319, 286, 321, 418, 350/419, 589, 590, 252, 255, 487; 354/65, 286; 356/138; 310/311, 317, 320, 328

[56] References Cited

U.S. PATENT DOCUMENTS

| | | | |
|---|---|---|---|
| 3,506,328 | 4/1970 | Seki | 350/6.7 |
| 3,508,832 | 4/1970 | Schroeder | 356/138 |
| 3,560,081 | 2/1971 | Appler | 350/484 |
| 3,728,948 | 4/1973 | Fraser | 354/65 |
| 4,088,396 | 5/1978 | Edelstein | 350/252 |
| 4,099,852 | 7/1978 | Kobierecki et al. | 350/255 |
| 4,289,379 | 9/1981 | Michelet | 350/419 |
| 4,290,684 | 9/1981 | Hines | 354/286 |
| 4,523,120 | 6/1985 | Assard et al. | 310/317 |
| 4,533,219 | 8/1985 | Aldrich | 350/487 |
| 4,614,405 | 9/1986 | Brandenberg | 350/286 |
| 4,705,365 | 11/1987 | Wakita et al. | 350/487 |
| 4,708,420 | 11/1987 | Liddiard | 350/487 |
| 4,727,278 | 2/1988 | Staufenberg, Jr. et al. | 310/328 |

OTHER PUBLICATIONS

Burns, R. P., "On the Possibility of Using Conical Refraction Phenomena for Laser Beem Steering", Applied Optics, Dec. 1964, vol. 3, No. 12, pp. 1505-1506.

"Optical Beam Steering Device-Final Report", prepared by the Electro-Optical Laboratory, North American Aviation, for Goddard Space Flight Center, Md., C6-3203/401, Jan. 18, 1967.

Johansen, T. R., et al., "Wide Angle Laser Beam Steering", Technical Report AFAL-TR-74-183, Sep. 1974.

Primary Examiner—Bruce y. Arnold
Assistant Examiner—Loha Ben
Attorney, Agent, or Firm—H. Fredrick Hamann; Harry B. Field; David C. Faulkner

[57] ABSTRACT

The present invention relates to an apparatus and method for steering a light beam which utilizes the relative positioning of adjacently disposed semi-spherical windows to provide the desired steering.

8 Claims, 1 Drawing Sheet

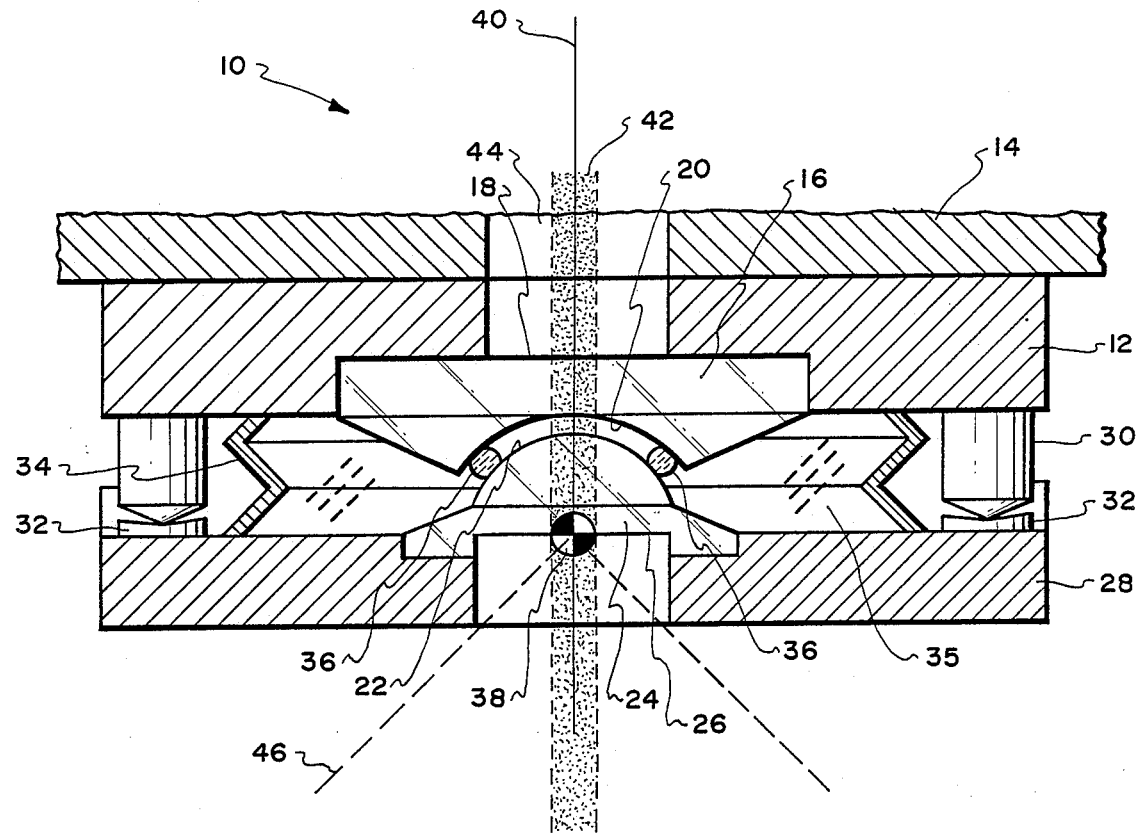

TWO-AXIS BEAM STEERING APPARATUS

STATEMENT OF GOVERNMENT INTEREST

The Government has rights in this invention pursuant to Contract (or Grant) No. F30602-85-C-0116 awarded by the U.S. Department of Air Force.

BACKGROUND OF THE INVENTION

1. Field of the Invention

The present invention relates, generally, to light beam steering mechanisms, and more particularly, to an apparatus and method for steering a light beam which utilizes the relative positioning of adjacently disposed semi-spherical windows to provide the desired steering.

2. Description of the Prior Art

U.S. Pat. No. 4,289,379 issued to G. Michelet discloses a variable focal length lens including a fluid medium within the optical path. The device uses a piezo-electric element which modifies the curvature of the lens in response to an input voltage.

U.S. Pat. No. 4,614,405 issued to W. M. Brandenberg discloses a wide-angle laser window adapted to be mounted to an aircraft. It contains a first transmissive window and second transmissive window pivotally mounted relative to the first window. Flexible seal means join the first and second windows to define a fluid cell therebetween containing a fluid. The first window, second window and fluid have indices of refraction which are substantially matched for generally undegraded transmission of the light beam.

Although Brandenberg teaches optical steering using fluid between the two windows, precision optical steering cannot be achieved with this device. Time-dependent thermal variations between the glass and fluid will cause index variations resulting in time-dependent beam steering.

For example, if the windows were made of synthetic fused silica with an index of refraction typically equal to 1.4584 at 589.3 nm and index matched with a standard fused silica matching fluid of index of refraction typically equal to 1.4587 at 589.3 nm, the difference in index is only $3 \times 10^{-4}$ which is constant with time. However, the rate of change of the index of refraction due to temperature change (dn/dt) is $1.28 \times 10^{-5}/°$ C. for fused silica for the temperature range 0° to 700° C. compared to $-3.86 \times 10^{-4}$ between 15° to 35° C. for the index matching fluid. This difference in thermal index of refraction between the glass and fluid will steer the beam variable amounts. This temperature sensitive beam steering is a major disadvantage of the Brandenberg patent for precision beam steering.

For beam steering with an angular precision requirement of one milliradian or less with a nominal beam deviation of 0.1 radian, the temperature differential between the window and the fluid would have to be less than 0.03° C. The use of fluid between the windows is undesirable for precision beam steering where the angle of incidence is changing on the second window.

Of a particular concern in the Brandenberg patent is the generation of pressure waves in the index matching fluid as the beam steering angle is changed. These pressure waves will lead to small index of refraction variations affecting both beam quality and angular beam jitter.

OBJECTS AND SUMMARY OF THE INVENTION

A primary object of the present invention, therefore, is to achieve two-axis light beam steering with high precision.

Another object is to minimize the effect of beam steering caused by temperature differences between the windows and the index matching fluid.

Yet another object is to minimize reflective losses from the window surfaces.

Other objects, advantages and novel features of the present invention will become apparent from the following detailed description of the invention when considered in conjunction with the accompanying drawing.

DETAILED DESCRIPTION OF THE INVENTION

The present invention is an apparatus for steering a light beam in two orthogonal tilt axes. In its broadest aspects the invention includes a stationary window for receiving the light beam desired to be steered, the window having a flat, entrance surface and a semi-spherical exit surface. The invention also includes an opposing rotatable window having a semi-spherical entrance surface and a flat exit surface. The entrance surface has a radius of curvature substantially equal to that of the semi-spherical exit surface of the stationary window. The exit surface of the stationary window is separated by the entrance surface of the rotatable window by a desired gap. Mounting means are provided for maintaining the desired gap and for pivoting the rotatable window about a point of rotation defined by the intersection of the optical axis of the light beam and the exit surface of the rotatable window. The gap is minimized to provide for minimal refraction of light traveling therethrough yet sufficiently wide to allow non-contact relative motion between the stationary window and the rotatable window. A flexible seal for containing a fluid completely filling the gap is also provided. The fluid transmits the light beam from the stationary window to the rotatable window. The direction of the light beam remains substantially constant as it leaves the exit surface of the stationary window, is transmitted through the fluid, and enters the rotatable window. However, the beam is steered in a desired direction as it descends from the exit surface of the rotatable window.

By providing the window/fluid entrance and exit angles at normal incidence, the effect of thermal beam steering between the window/fluid interfaces is minimized.

The invention utilizes a fluid volume which is constant during beam steering thereby minimizing deleterious beam steering effects.

BRIEF DESCRIPTION OF THE DRAWING

The sole FIGURE is an elevational view, partially in cross-section, of the preferred embodiment of the present invention.

The same elements or parts throughout the FIGURE of the drawing are designated by the same reference character.

DETAILED DESCRIPTION OF THE INVENTION

In the sole FIGURE, the apparatus for steering a light beam is indicated generally as 10. A stationary housing 12 of the apparatus 10 is rigidly attached to the instrument 14. The stationary housing 12 rigidly supports a transmissive stationary window 16. The stationary window 16 has a flat entrance surface 18 and a semi-spherical exit surface 20 on the opposite side thereof. The exit surface 20 opposes the semi-spherical entrance surface 22 of a transmissive rotatable window 24. The rotatable window 24 has a flat exit surface 26 on the opposite side thereof. The semi-spherical entrance surface 22 has a radius of curvature substantially equal to that of the semi-spherical exit surface 20 of the stationary window 16. The rotatable window 24 is rigidly attached to a rotatable housing 28 which, like the stationary housing 12.

Piezoelectric transducer (PZT) actuators 30 (only two being illustrated in the FIGURE) extending from the lower surface of the stationary housing 12 are equidistantly located about the periphery of the stationary housing 12. Each actuator 30 is positioned to impart a force between stationary housing 12, attached to instrument 14 and stop 32 on the opposing rotatable housing 28, thus providing precise rotation of window 24 about point of rotation 38.

A sealed bellows 34 is located about the peripheries of the stationary window 16 and rotatable window 24 between those windows and the linear actuators 30. The bellows 34 has a first end in contact with the stationary housing 12 and a second end in contact with the rotatable housing 28. The bellows 34 is installed to provide the necessary preload to maintain contact between the actuators 30 and the stops 32. A fluid 35 is contained within the bellows 34.

A plurality of bearings 36 are disposed between the semi-spherical exit surface 20 and the semi-spherical entrance surface 22. Thus, when the linear actuators 30 are moved the rotatable window 24 is pivoted about a point of rotation 38 defined by the intersection of the optical axis 40 and exit surface 26 of the rotatable window 24. The gap between the windows 16,24 is minimized to provide for minimal refraction of light traveling therethrough yet sufficiently wide to allow non-contact relative motion between the stationary window and the rotatable window.

During operation, the light beam 42 desired to be steered is introduced through an opening 44, in the instrument 14 and is transmitted through the stationary window 16 without a substantial change in direction. Furthermore, since the semi-spherical stationary window 16 has substantially the same radius of curvature as the semi-spherical rotatable window 24 the light beam has no substantial change in direction as it passes through the semi-spherical exit surface 20/fluid 35 interface and the fluid 35/semi-spherical entrance surface 22 interface. The beam 42 is steered in the desired direction within cone angle 46 as it descends from the exit surface of the rotatable window.

To provide enhanced high transmission efficiency, the indices of refraction of the stationary window 16, rotatable window 24, and fluid 35 may be made to be equal. In this case, the light beam 42 sees the entire apparatus 10 as a single entity since there are no deviations in index of refraction, and the light beam 42 follows a straight path between the entrance and exit surfaces of the windows.

Or, anti-reflectivity coatings may be formed on the semi-spherical exit surface 20 of the stationary window 16 and on the semi-spherical entrance surface 22 of the rotatable window 24 with the fluid being a gas such as air. In this case, although the path within the apparatus 10 is no longer perfectly straight, there will be no back reflections and since the rotatable window 24 is spherical, the shape of the path will not change with a change in apparatus angle.

Obviously, many modifications and variations of the present invention are possible in light of the above teachings. It is therefore to be understood that, within the scope of the appended claims, the invention may be practiced otherwise than as specifically described.

For example, it is intended that this invention be applied to any set of windows so constructed that the gap distance between the windows remains nearly constant as the angle between the two windows is varied. The outer surfaces may have any shape and are not confined to be planar surfaces. For example, the system entrance or exit may be non-planar so as to have focussing power.

What is claimed:

1. An apparatus for steering a light beam in two orthogonal tilt axes, said light beam having an optical axis, comprising:
    a transmissive, stationary window for receiving the light beam desired to be steered, said stationary window having a flat entrance surface and a semi-spherical exit surface on the opposite side thereof;
    a transmissive, rotatable window, said rotatable window having a semi-spherical entrance surface and a flat exit surface on the opposite side thereof, said semi-spherical entrance surface having a radius of curvature substantially equal to that of the semi-spherical exit surface of said stationary window, the semi-spherical exit surface of the stationary window being separated from the semi-spherical entrance surface of the rotatable window by a desired gap;
    mounting means, including a stationary housing for supporting said stationary window and a rotatable housing for supporting said rotatable window, to maintain said desired gap and for pivoting said rotatable window about a point of rotation defined by the intersection of said optical axis and the exit surface of said rotatable window, said gap being minimized to provide for minimal refraction of light traveling therethrough yet sufficiently wide to allow non-contact relative motion between the stationary window and the rotatable window;
    a plurality of linear actuator means located between said stationary and rotatable housings and equidistantly disposed about the periphery of said rotatable and stationary windows, attached to said stationary housing and being capable of imparting a force to the rotatable housing; and
    a flexible seal for containing a fluid completely filling said gap, said fluid for transmitting said light beam from said stationary window to said rotatable window, the direction of the light beam remaining substantially constant as it leaves the exit surface of the stationary window, is transmitted through said fluid, and enters said rotatable window, but being steered in a desired direction as it descends from the exit surface of the rotatable window.

2. The apparatus of claim 1, wherein indices of refraction of said stationary window, rotatable window and fluid are all equal, thereby providing high transmission efficiency.

3. The apparatus of claim 1, further including:
    anti-reflective coatings formed on the semi-spherical exit surface of the stationary window and the semi-spherical entrance surface of the rotatable window, said stationary window and said rotatable window having an index of refraction substantially equal, thereby providing high-transmission efficiency.

4. The apparatus of claim 1, wherein said actuator means comprise piezoelectric transducer actuators.

5. The apparatus of claim 1, further including a plurality of bearings disposed between said semi-spherical exit surface and semi-spherical entrance surface.

6. The apparatus of claim 1, wherein said flexible seal includes a sealed bellows located about the periphery of said stationary window and rotatable window but between said linear actuator means and said stationary and rotatable windows, said bellows having a first end in contact with the stationary housing and a second end in contact with the rotatable housing, said bellows containing said fluid.

7. The apparatus of claim 1, wherein said stationary window has a circular cross-section.

8. The apparatus of claim 1, wherein said rotatable window has a circular cross-section.

* * * * *